Oct. 24, 1939.  C. T. SAMUELSON  2,176,926
RECONDITIONED SHIP AND METHOD OF INSTALLING INTERNAL BULKHEADS IN SHIPS
Filed July 26, 1935  5 Sheets-Sheet 1

INVENTOR:
Charles T. Samuelson,
BY
His ATTORNEY.

Oct. 24, 1939.  C. T. SAMUELSON  2,176,926
RECONDITIONED SHIP AND METHOD OF INSTALLING INTERNAL BULKHEADS IN SHIPS
Filed July 29, 1935   5 Sheets-Sheet 2

INVENTOR.
Charles T. Samuelson,
BY
His ATTORNEY.

Oct. 24, 1939.       C. T. SAMUELSON       2,176,926
RECONDITIONED SHIP AND METHOD OF INSTALLING INTERNAL BULKHEADS IN SHIPS
Filed July 26, 1935       5 Sheets-Sheet 3

INVENTOR:
Charles T. Samuelson,
BY
His ATTORNEY.

Oct. 24, 1939.  C. T. SAMUELSON  2,176,926
RECONDITIONED SHIP AND METHOD OF INSTALLING INTERNAL BULKHEADS IN SHIPS
Filed July 26, 1935   5 Sheets-Sheet 4

INVENTOR.
Charles T. Samuelson,
BY
His ATTORNEY.

Patented Oct. 24, 1939

2,176,926

UNITED STATES PATENT OFFICE 2,176,926

RECONDITIONED SHIP AND METHOD OF INSTALLING INTERNAL BULKHEADS IN SHIPS

Charles T. Samuelson, Beaumont, Tex., assignor to Pennsylvania Shipyards, Inc., Beaumont, Tex., a corporation of Delaware Application July 26, 1935, Serial No. 33,269

10 Claims. (Cl. 114—116)

This invention relates to the reconditioning of cargo vessels and more particularly the renewal of the internal thwartship and longitudinal bulkheads of oil tankers, the metal shells of which are of the riveted type of construction, and which bulkheads in those cases where the tankers are employed exclusively in the transportation of gasoline, in particular, deteriorate rapidly due to unavoidable corrosion, with the consequence that at the end of a comparatively short span of years, some seven to ten years, such internal bulkheads require renewal.

The complete removal of the old bulkheads and their replacement with new bulkheads, also riveted to the shell in the manner similar to that employed when installing the original bulkheads, is an extremely laborious and expensive procedure and, furthermore, inevitably results in the loosening of the old rivets in the shell in the areas adjacent those in which such riveting operations are conducted, with consequent extensive leakage occurring through the joints around such loosened rivets which leakage cannot be satisfactorily prevented even by extensive caulking operations. Accordingly, although tankers which are employed exclusively in the transportation of crude oil, frequently have a life in excess of twenty years, nevertheless, as above stated, those employed exclusively in the transportation of gasoline frequently have a life of less than ten years. When one considers that the large petroleum tankers frequently cost in excess of $1,500,000 to construct, it can be readily appreciated how important is the problem of the economical renewal of the bulkheads, since if the same can be so replaced, the renovated tanker will have its life prolonged at least some ten years.

My investigations have led to the discovery that the corroded internal bulkheads of old tankers of the riveted type on construction can be expeditiously and economically replaced in the manner hereinafter described and that as a consequence the life of such tankers can be greatly prolonged, in fact substantially doubled, at a total cost of but a small fraction of the value of the reconditioned tanker.

In the accompanying drawings in which I have illustrated diagrammatically the manner in which such replacement of the internal bulkheads of tankers is accomplished in accordance with my invention—

Figures 1 and 1a are respectively diagrammatic horizontal fragmental fore and aft sections of the hull of an oil tanker which has been reconditioned in accordance with my invention, the longitudinals of such hull construction not being illustrated therein;

Figure 11:
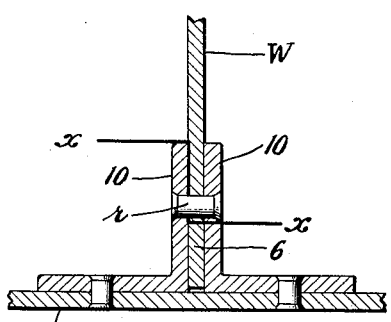
Figure 12:
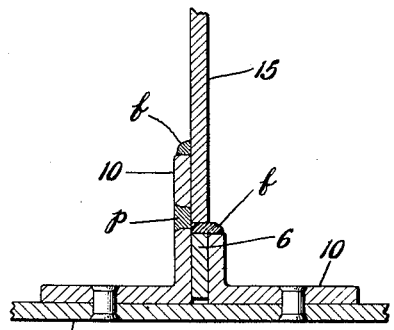
Figure 13:
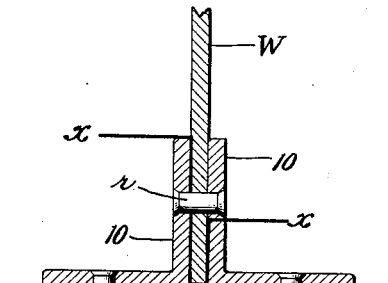
Figure 14:
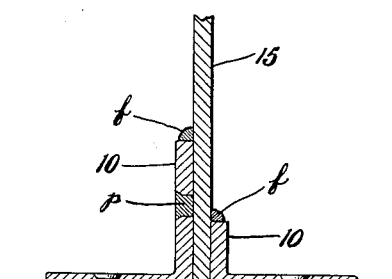
Figure 15:
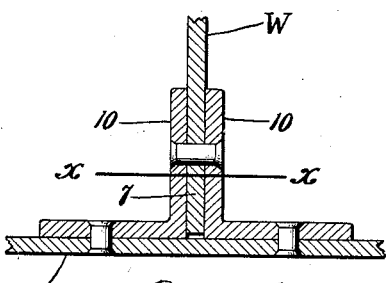
Figure 16:
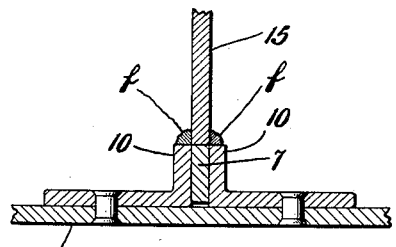
Figure 17:
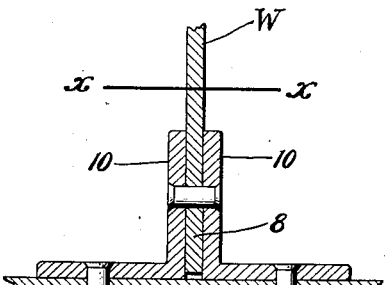

Figs. 11 and 12; Figs. 13 and 14; Figs. 15 and 16 and Figs. 17 and 18 are views generally similar to Figs. 3 and 4 but showing several different ways for removing old bulkheads and for the welding of the replacement bulkheads to the original or to the abbreviated bounding angles.

Referring to the drawings and the construction shown therein, the reference numeral 1 designates the sides of the metal shell or plating of the hull of a tanker to be reconditioned, 2 the bottom and 3 the deck of such shell and 4, 4' the fore and aft cofferdam bulkheads. The numerals 5, 6, 7 and 8 designate different forms of toes or stumps of the original internal thwartship and centerline bulkheads which remain according to the particular cutting operation that is performed, in the manner hereinafter described. The numeral 9 (see Fig. 2 which is the only figure in which these longitudinals are reproduced), designates the frame longitudinals to which the separate strakes or plating of the shell of the hull are secured.

The usual bounding angles 10, which are riveted to the sides, bottom and decks of the shell, serve to retain the original internal and centerline bulkheads, which are riveted thereto, in position.

The replacement bulkheads are formed of separate strakes, certain of which are welded to the bounding angles and/or to outward portions or stumps of the original bulkheads in accordance with the procedures illustrated in Figs. 4, 12, 14, 16 and 18.

In the replacement of bulkheads in accordance with my invention, assembly of the bulkheads from the individual strakes may be accomplished in several different ways but preferably in accordance with one of the following procedures, viz:—

Figure 2:
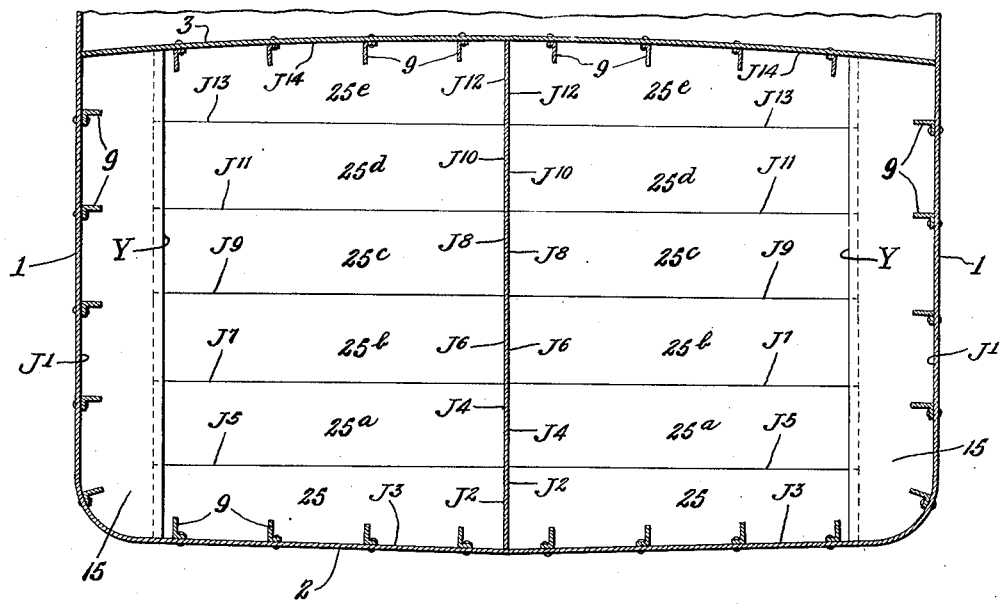
Fig. 2 is a diagrammatic transverse, vertical section on the line 2—2 of Fig. 1, except that the bounding angles and associated rivets are not shown.
Figure 3:
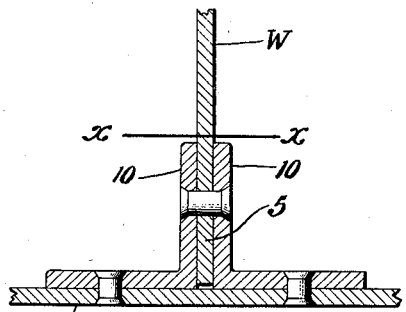
Fig. 3 is a diagrammatic fragmental, enlarged horizontal section showing the old transverse or thwartship bulkhead and the original bounding angles by which the same is riveted to the shell of the tanker.
Figure 18:
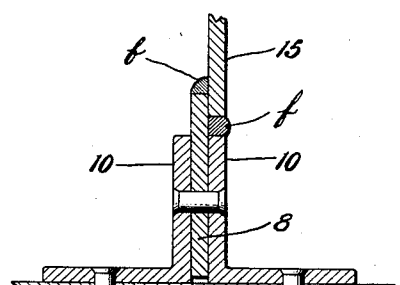

The strakes of the old bulkhead, such as the bulkhead W, are severed along the line x—x in Fig. 3 and a strake of the replacement bulkhead, such for example as the vertical marginal strake 15 (Fig. 2) is then butt welded to the stumps 5 of the strakes of such original bulkhead, this being preferably accomplished by means of an arc welding operation, whereby fillet welds f are formed which serve not only to unite the inner ends of the stumps 5 of the strakes of the former bulkhead to the inner edges of the bounding angles 10, but also to unite the abutting edges of the stump 5 to the strake 15; or again, a zig-zag cut may be made along the line x—x in Fig. 11 so as to cut away a portion of one of the bounding angles to a point inside of the rivet r and flush with the stump 6 of the severed bulkhead, then a strake, such as said vertical strake 15 is butt welded in the manner illustrated in Fig. 12 to said stump 6 and welded by fillet f to the abbreviated bounding angle and also lap welded to the unaltered portion of the other bounding angle. The rivet hole in the latter bounding angle is plugged by means of a plug weld p. If preferred, a cut may be made along the zig-zag line x—x shown in Fig. 13, the strakes of the old bulkhead removed and the new strake, such as the vertical strake 15, inserted between the abbreviated bounding angle and the unaltered bounding angle, the same being secured in position by lap welding the same to the unaltered bounding angle and by welding the same by means of the fillet f to the resultant abbreviated bounding angle. The rivet hole is likewise plugged by a plug weld p, all as indicated in Fig. 14. Again, if desired, a straight cut may be made, as indicated by the line x—x in Fig. 15, and a new strake, such as the vertical strake 15, is then butt welded to the stump 7 of the strake of the old bulkhead and also welded to the adjacent inner ends of the abbreviated bounding angles. Or again, a similar straight cut may be made through the old bulkhead W, such as indicated by the line x—x of Fig. 17 and the strake 15 located on one of the bounding angles 10 and then the same is lap welded to the stump 8 of the former bulkhead and also welded to the inner edge of one of the bounding angles, all as shown in Fig. 18.

Of course, it is to be understood that in lieu of welding a vertical strake, such as the strake 15 shown in Fig. 2, to the bounding angles and/or to the stump of the strake of the former bulkhead in the manner illustrated in Figs. 4, 12, 14, 16 and 18, the horizontal strakes of the replacement bulkhead may be welded to the stumps 5, 6, 7 and 8 of the strakes of the former bulkhead in the manner illustrated in said Figs. 4, 12, 14, 16 and 18.

In the renewal of the bulkhead of vessels of the riveted type of construction as hereinbefore mentioned, it is of the utmost importance that not only should any excessive heat be prevented from reaching the areas containing the old rivets but also that the welding strains, both on the new strakes of the replacement bulkhead and on the shell rivets, which ordinarily develop during welding operations, shall be minimized and in fact practically eliminated.

Figure 1:
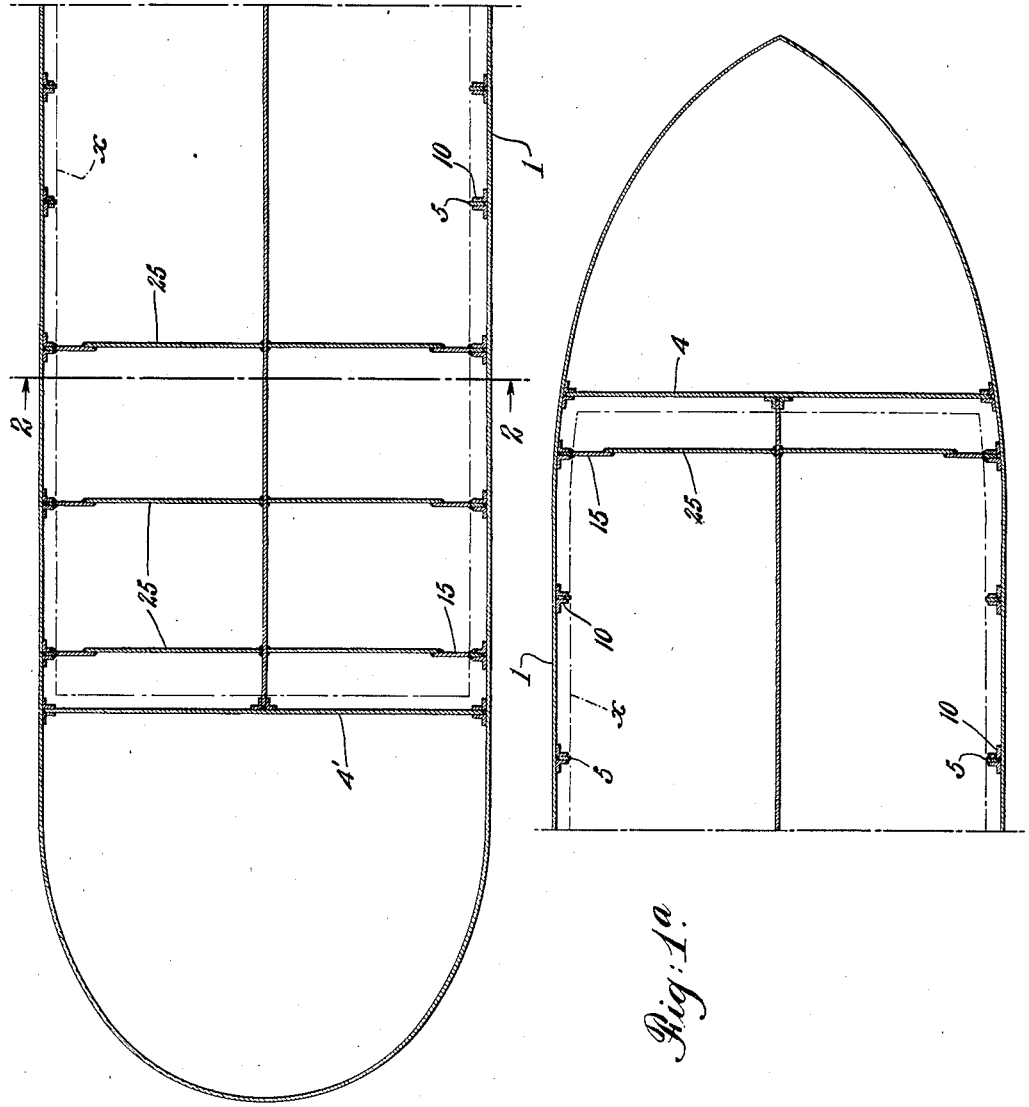

My investigations have led to the discovery that it is imperative in the locating and welding of each strake of a replacement bulkhead that each individual strake as assembled in position should not be welded completely around its entire perimeter to the adjacent surfaces to which it is to be secured until such time as a considerable number, and preferably all, of such strakes or plates have been welded to each other, thus forming an expansion joint and thereby the pulling strains set up during the welding can be effectively dissipated and the warping or buckling of the strakes, due to such strains, can be effectively prevented. This novel method of assembling and welding together the strakes of the new bulkhead is preferably accomplished as follows:

If a bulkhead of the construction, such as the horizontal strake construction shown in Fig. 2, is to be installed, the strake 15 is first located and welded along the joint $J^1$ to the sides 1, bottom 2 and deck 3 of the shell in accordance with either of the procedures shown in Figs. 4, 12, 14, 16 or 18. Thereupon the bottom strake 25 is located and welded, in accordance with the procedure illustrated in Figs. 4, 12, 14, 16 or 18 along joint $J^2$ either directly to a new centerline bulkhead, as indicated in Figs. 1 and 1a, or when such centerline bulkhead is not to be renewed, then such bottom strake is welded along joint $J^2$ to the stumps 5, shown in Fig. 2 of the old thwartship bulkhead. The joint $J^3$ is then welded in accordance with either of the procedures shown in Figs. 4, 12, 14, 16 or 18. Thereafter the intermediate strakes 25a, 25b, 25c and 25d are successively located and welded in orderly progression along the joints $J^4$ to $J^{11}$ inclusive. The strake 25e is then located and welded in orderly succession along joints $J^{12}$, $J^{13}$, and $J^{14}$. When all of the strakes 25, 25a, 25b, 25c, 25d and 25e have been welded together as aforesaid, the common lapped expansion joint Y is then welded. In a similar manner the strakes on the opposite side of the centerline bulkhead are located and welded.

Figure 4:
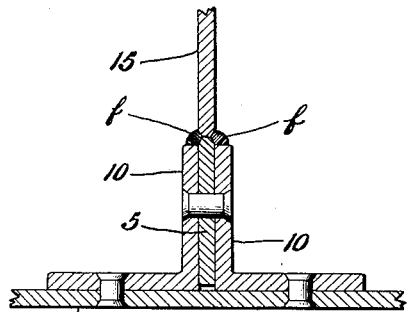
Fig. 4 is a section generally similar to Fig. 3, but showing the new transverse bulkhead welded to such bounding angles and to the stump of the former bulkhead which it replaced.
Figure 5:
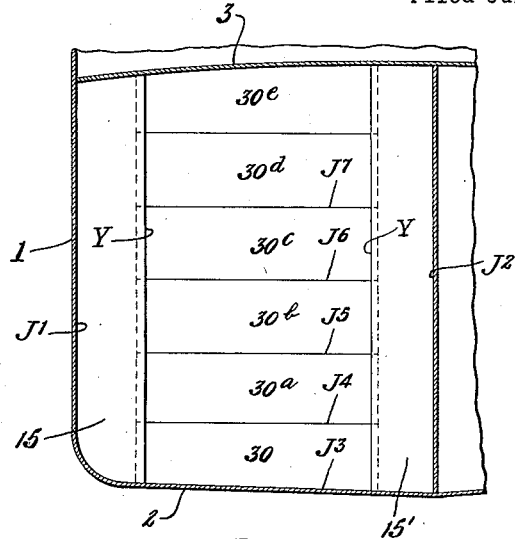
Figs. 5, 6, 7 and 8 are diagrammatic fragmental vertical sections showing several different ways for replacing bulkheads in a tanker in accordance with my invention.

In the welding procedure illustrated in Fig. 5, the vertical strake 15 is first located and welded along the joint $J^1$ to the shell only of the hull in accordance with either of the procedures shown in Figs. 4, 12, 14, 16 and 18 and the other vertical strake 15' is then welded along joint $J^2$, either directly to a new centerline bulkhead or to the stumps of strakes of the old thwartship bulkhead that is to be replaced in accordance with either of the procedures shown in Figs. 4, 12, 14, 16 and 18. Thereupon each of the horizontal strakes 30 is located and welded to the bottom 2 of the shell along the joint $J^3$ in the same manner as employed in welding strake 25 (Fig. 2) to the bottom 2 of the shell. Then the horizontal strakes 30a, 30b, 30c and 30d are successively located and welded together in orderly succession along the next lower strakes to joints $J^3$, $J^4$, $J^5$, $J^6$ and $J^7$. The strake 30e is then successively welded to strake 30d and then to the deck 3 and then the expansion joints Y which extend completely along the vertical edges of all of the strakes 30, 30a, 30b, 30c and 30d are successively closed by first welding all of these latter horizontal strakes along their vertical edges to either of the vertical strakes 15 and 15' and then welding such horizontal strakes along their vertical edges to the other vertical strake.

Figure 6:
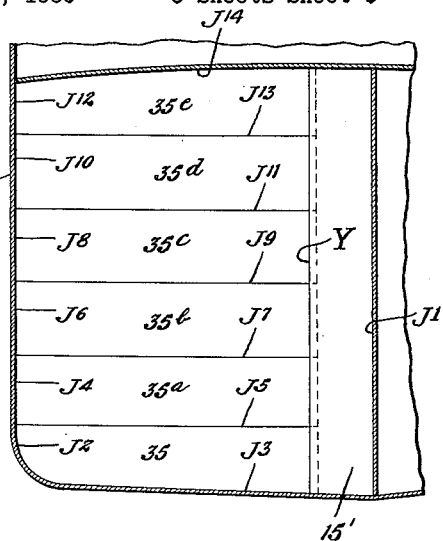

In the procedure illustrated in Fig. 6, the strake 15' is first located and welded to the centerline bulkhead along the joint $J^1$ in accordance with one of the procedures hereinbefore described respecting the uniting of the vertical strake shown in Fig. 5 to the centerline bulkhead and then the strakes 35, 35a, 35b, 35c, 35d and 35e are welded to the side 1 and to each other in orderly succession along the joints J² to J¹³ inclusive. The strake 35e is then welded along the joint J¹⁴ to the deck 3. Thereafter the expansion joint Y between the vertical strake 15' and the horizontal strake is welded.

Figure 7:
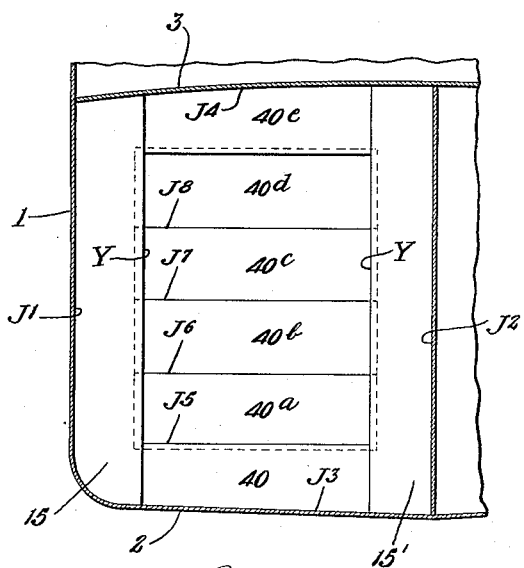

In the procedure shown in Fig. 7, the vertical strakes 15 and 15' are successively located and welded, in orderly succession, along the joints J¹ and J² to the side 1 and to the centerline bulkhead. Then the strakes 40 and 40e are welded along the joints J³ and J⁴ to the bottom 2 and deck 3 and then the strakes 40a, 40b, 40c and 40d are located and welded, in orderly succession, to each other along the joints J⁵, J⁶, J⁷ and J⁸ and then the expansion joints Y between the vertical and horizontal strakes and between the strakes 40d and 40e are closed by welding, in orderly succession, first along one expansion joint and then another.

Figure 8:
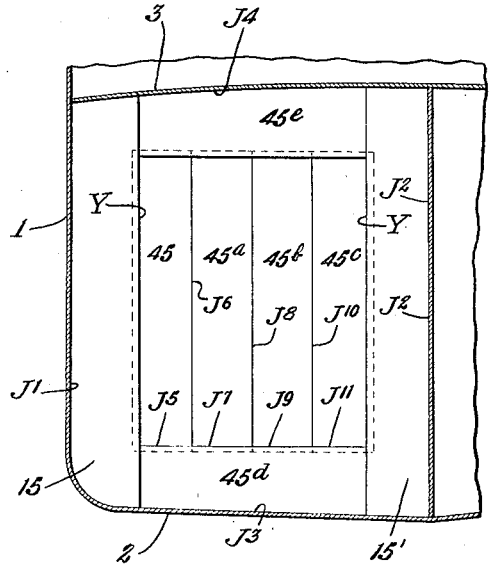

In the procedure illustrated in Fig. 8, wherein vertical intermediate strakes 45, 45a, 45b and 45c are employed, the welding proceeds progressively along the joints J¹ to J¹¹ inclusive and then the lapped expansion joints Y are successively closed by welding the same.

Figure 9:
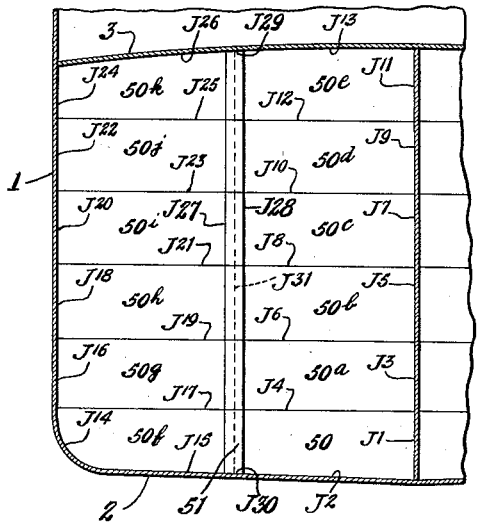
Figs. 9 and 10 are diagrammatic fragmentary vertical sections of still further modifications wherein butt straps are employed to secure the plates of the replacement bulkheads together.
Figure 10:
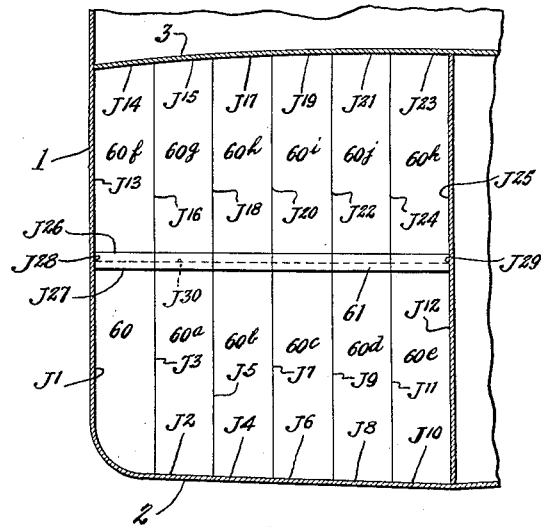

In the procedure illustrated in Fig. 9 wherein a butt strap is employed, the strakes 50 to 50k inclusive are successively located and welded in orderly succession along the joints J¹ to J²⁶ inclusive and then the butt strap 51 is welded to the two abutting series of strakes by successively welding in orderly succession along the joints J²⁷, J²⁸, J²⁹, J³⁰ and J³¹. Likewise in the procedure illustrated in Fig. 10, wherein two abutting series of vertical strakes 60 to 60k are employed in constructing the thwartship replacement bulkhead, and a butt strap is also used to seal the joint between the lapped strakes, the strakes are successively located and welded in orderly succession along the joints J¹ to J²⁵ and then the two abutting series of strakes 60 to 60e and 60f to 60k respectively are united by means of a horizontal butt strap 61, the same being first located and then successively welded along the joints J²⁶, J²⁷, J²⁸, J²⁹ and J³⁰ respectively.

In those cases where the strakes of the new bulkhead are secured to the old bounding angle in accordance with the procedure shown in Figs. 4 and 18, it is desirable that the rivets which secure the old bounding angles to each other and to said stump, be solid welded around the outer perimeters of their heads to the bounding angles, in order to insure against any leakage therearound and preferably also the inner heads of the respective rivets, which secure the bounding angles to the shell, are also solid welded around their perimeter.

It will, of course, be understood that the drawings herein, other than the detail section, are essentially diagrammatic and no attempt has been made to show the transverse web frames commonly employed in ship construction or the individual strakes of the shell 1, 2 and 3 of which it is to be understood the metal shell is composed.

The line x shown in Fig. 1 and Fig. 1a, is intended to correspond generally to the line x—x of the detail section Fig. 3. Furthermore, it is to be understood that in Figs. 2 and 5 to 10 inclusive no bounding angles are shown. This is because these figures are essentially diagrammatic so it is to be understood that insofar as the procedure shown in these figures is followed in the reconditioning of old cargo vessels wherein the bulkheads are secured to the metal shell of the hull by means of bounding angles that are riveted to said bulkhead and to said shell respectively, it is contemplated that the edges of the strakes of the new bulkheads which are adjacent the shell of the hull will be secured to the hull in the manner shown generally in either of Figs. 4, 12, 14, 16 or 18.

The procedure for assembling and welding together the strakes of a new bulkhead, such as described and claimed herein, may also be followed in those cases where a new ship is under construction wherein the shell thereof consists of strakes that are welded together and to which it is desired to weld the abutting strakes of the thwartship bulkheads, since in this manner the undue pulling strains which would otherwise be set up, as hereinbefore mentioned, can be successfully prevented.

It is, of course, to be understood that while I have indicated various preferred procedures which may be employed for the assembly and welding of the strakes of the new bulkheads, that same may be assembled and welded in a different order than any of those herein specified, provided the essential feature as herein described, namely the formation of one or more common expansion joints, preferably lapped joints, by the alined edges of successive strakes, is effected, and such expansion joints are not closed until the strakes have otherwise been substantially completely positioned and welded in part to each other, as thereby one of the essential features of my invention can be realized, namely the dissipation of the pulling strains set up in welding and which would otherwise occur if the individual strakes were each completely welded around the entire four edges thereof before the next strake was positioned and welded. These pulling strains would be especially severe, if strakes of sufficient length to extend substantially the full length from the skin of the vessel to the centerline bulkhead are employed and individually so completely welded. Such pulling strains, unless prevented as herein described, tend to pull the sides of the skin of the vessel inwardly and to warp and distort the rivets, the riveted seams in such sides and even the strakes themselves, with the consequence that serious leakage would develop. Furthermore such construction would obviously be highly objectionable because of such distortion even if such leakage could be effectively cured. While I preferably cut the bounding angles and the old bulkheads along a line x—x that is at least several inches, for example about 4", from the inside of the skin of the hull, it is especially important that this distance should exceed one and one-half inches, as otherwise deleterious heating of the rivets in the shell of the hull cannot be effectively prevented during the welding operation.

Various modifications and changes may be made from the details of construction and procedure herein described without departing from the spirit of my invention as embraced within the scope of the appended claims.

Having thus described my invention, what I claim and desire to obtain by United States Letters Patent is:

1. The method of installing a bulkhead composed of metal strakes in a marine vessel, the hull of which has a metal shell, which comprises successively locating the component metal strakes in a suitable position to form the desired bulkhead and as substantially each intermediate strake of such bulkhead is so positioned, welding such strake completely along each edge of a plurality, but not all, of its edges to the respective edges of adjacent supporting elements which are carried by and extend transversely with respect to said hull and finally, when substantially all of the strakes of the replacement bulkhead have been so positioned and partially welded, completing the welding along those edges of all of the strakes which are as yet unwelded to such supporting elements.

2. The method of installing a bulkhead composed of metal strakes in a marine vessel, the hull of which has a metal shell and a centerline bulkhead, which comprises welding a vertical strake to one member of a group of members consisting of such shell and such centerline bulkhead, then successively positioning the other component strakes for the complete bulkhead and as each strake is located in position, welding the same completely along a plurality of its edges, but not all of them so as to leave at least one edge unwelded and finally completing the welding of all of the unwelded edges of each such strake to an adjacent strake.

3. The method of installing a bulkhead composed of metal strakes in a marine vessel, the hull of which has a metal shell and a centerline bulkhead, which comprises welding a vertical strake to one member of a group of members consisting of such shell and such centerline bulkhead, then successively positioning the other component strakes for the complete bulkhead and as each such component is located in position, welding the same completely along a plurality of its edges, but not all of them so as to leave the joint between a vertical edge of such strake and the adjacent vertical edge of each component vertical strake unwelded and finally closing, by a welding operation, the joints between said vertical edge of the vertical strake and the adjacent edges of component strakes.

4. The method of installing a bulkhead composed of metal strakes in a marine vessel whose hull has a shell composed of metal strakes, which comprises locating a strake in a suitable position to form a component strake of the desired bulkhead and in such a manner as to extend in a plane at substantially a right angle to said shell, welding such strake to said shell and then locating the other component strakes of the desired bulkhead and successively welding the same together, but not to said first mentioned strake, and finally completing the welding of said first mentioned strake to all of the other strakes and all of the latter strakes to the edges of all adjacent supports to which they have not already been welded.

5. In the reconditioning of marine vessels having a shell composed of metal strakes and internal bulkheads which are secured by bounding angles which are riveted thereto and to said shell, the steps which comprise removing substantially all of the former bulkheads with the exception of a marginal stump portion, successively locating the component strakes of the new bulkhead and welding the same to each other and to the adjacent edges of the old bounding angles and to said marginal stump portion of the former bulkhead at a distance of at least one and one-half inches from the shell and sufficiently remote to prevent the deleterious heating of the shell of such bulkhead during the welding operation.

6. In the reconditioning of marine vessels having a shell composed of metal strakes and internal bulkheads which are secured by bounding angles which are riveted thereto and to said shell, the steps which comprise removing substantially all of the former bulkheads with the exception of a marginal stump portion, and also simultaneously removing portions of a large number of the old bounding angles, successively locating the component strakes of the new bulkhead, welding said strakes to each other and welding the bounding angles and the stump portion of the abbreviated bulkhead to the marginal strakes of such new bulkhead at a distance of not less than one and one-half inches from the shell and sufficiently remote to prevent the deleterious heating of the shell of such bulkhead during such welding operation.

7. In the reconditioning of a marine vessel having a shell composed of metal strakes and in which the bulkheads are composed of metal strakes which are riveted to bounding angles that are in turn riveted to said shell or to an internal bulkhead, the steps which comprise removing substantially all of the bulkhead to be replaced which is not embraced by such bounding angles, then positioning the marginal strakes for the new bulkhead and welding the same to the old bounding angles supporting the stump of the former bulkhead without uniting all of said marginal strakes together, then successively locating the component intermediate strakes of the new bulkhead and as each strake is located, welding the same completely along a plurality of the edges thereof but not all of its edges to an adjacent strake in such a manner as to leave a lapped expansion joint along alined edges of each of the intermediate strakes and finally closing the expansion joint and any other joints between the various strakes that remain unwelded by a welding operation.

8. A reconditioned hull of a marine vessel having a metal shell and numerous pairs of bulkhead-retaining metal bounding angles riveted thereto and a plurality of replacement bulkheads formed of metal strakes which are welded to the edges of said bounding angles at a substantial distance, and not less than one and one-half inches from said shell 9 A reconditioned hull of a marine vessel having a metal shell and numerous pairs of bulkhead-retaining bounding angle irons riveted thereto and a plurality of replacement bulkheads formed of metal strakes, the marginal strakes of which are welded to the edges of certain of said bounding angles and to stump portions of a former bulkhead at a distance of not less than one and one-half inches from said shell.

10. A reconditioned hull of a marine vessel having a skeleton longitudinal frame and a shell composed of numerous metal strakes riveted to said frame, bulkhead-retaining means riveted to said strakes, a plurality of stumps of old bulkheads retained by said latter means, and a plurality of replacement bulkheads certain of the strakes of which are welded to said bulkhead-retaining means at a short distance, not less than one and one-half inches, from the inner face of said shell.

CHARLES T. SAMUELSON.